United States Patent [19]
Von Hirsch et al.

[11] 3,977,953

[45] Aug. 31, 1976

[54] PROCESS FOR THE PRODUCTION OF HULUPONES

[75] Inventors: Hubert Frhr. Von Hirsch, Munich; Alfons Hartl, Germering, both of Germany

[73] Assignee: Atlantic Research Institute Ltd., Nassau, Bahamas

[22] Filed: Sept. 3, 1975

[21] Appl. No.: 610,010

Related U.S. Application Data

[63] Continuation of Ser. No. 348,305, April 5, 1973, abandoned.

[30] Foreign Application Priority Data

Apr. 10, 1972 Germany............................ 2217135

[52] U.S. Cl............................. 204/158 R; 426/248; 426/600
[51] Int. Cl.²........................................... B01J 1/10
[58] Field of Search............. 204/158 R; 426/16, 19, 426/237, 248

[56] References Cited

UNITED STATES PATENTS

| | | | |
|---|---|---|---|
| 1,945,067 | 1/1934 | Nozicka | 204/158 R |
| 2,652,333 | 9/1953 | Nilsson | 426/248 |
| 3,839,588 | 10/1974 | Sweett et al. | 426/349 |

*Primary Examiner*—Howard S. Williams
*Attorney, Agent, or Firm*—Browdy and Neimark

[57] ABSTRACT

Lupulones, which form a constituent of hop resins which have hitherto been separated and discarded because of their poor solubility, are converted into a hulupone-containing beer-soluble bitter-tasting product by photo-sensitized oxidation in a liquid alkaline medium. However, the oxidation, which is effected by means of oxygen or an oxygen-containing gas in the presence of one or more sensitizing dyes and under the action of visible light, is only partial; it is discontinued when the oxygen consumption resulting from the reaction exhibits a substantial decline, or when the fall in pH occurring during the reaction substantially ceases.

21 Claims, No Drawings

PROCESS FOR THE PRODUCTION OF HULUPONES

This is a continuation of application Ser. No. 348,305 filed Apr. 5, 1973, now abandoned.

This invention relates to the production of hulupones by photosensitized oxidation.

Hop resins contain not only the humulones, which mainly contribute to the bittering of beer, and certain undefined soft resins, but also a third group of constituents, namely the lupulones. Although these lupulones are very similar in chemical constitution to the humulones, they are separated during brewing and discarded because of their poor solubility. Their conversion into bitter-tasting compounds soluble in beer or water, however, would permit a substantial improvement in the utilization of hop resins.

This consideration is made particularly relevant by a certain recent development whereby the humulones are separated from the hop resins and separately isomerized. The material remaining after the separation of the humulones comprises an extract of bitter principles (known in the industry as "Basex") which, apart from being substantially free from humulone, contains up to 50% of lupulones. The conversion of the lupulones present in this substantially humulone-free material into products which could be utilized in brewing is therefore technically very desirable.

It is known that lupulones will undergo modifications of an oxidative character, giving small proportions of soluble bitter-tasting compounds, which may include hulupones. The deliberate oxidation of hop resins, so as to convert the lupulones into soft resins, has also been attempted, and in this connection reference may, for example, be made to German Pat. No. 941,965. This conversion, however, requires relatively long reaction times, and no well-defined products are obtained; also the yield is poor.

Although the products just mentioned can in principle be used as bittering substances for brewing purposes, they nevertheless have the disadvantage that, because of their impurity, and because they are not completely soluble, they can be added only during the wort boiling. Not only is a poor yield obtained in the oxidation of lupulones, but also the oxidation products have to be used differently from the isohumulones.

It is an object of the present invention, therefore, to provide a process for the conversion of lupulones, which normally cannot be used, into beer-soluble bitter-tasting substances, in a good yield and with satisfactory purity, and to provide a conversion product which can be added at a late stage in the brewing process (for example after the fermentation), and which can be used directly (for example for non-alcoholic bitter beverages), and which can thus be used together with the isohumulones.

More particularly, it is an object of the invention to effect the formation of hulupones, from lupulones, in a more rapid reaction and with a better yield than in the case of the previously proposed methods.

According to the present invention, we provide a process for the photosensitized oxidation of lupulones to give a hulupone-containing beer-soluble bitter-tasting product in a liquid alkaline medium by means of oxygen or an oxygen-containing gas, wherein the lupulones are submitted to an only partial oxidation in the presence of sensitizing dyes and under the action of visible light, and wherein this oxidation is continued until the oxygen consumption resulting from the reaction exhibits a substantial decline or until the fall in pH occurring during the reaction substantially ceases. It has in fact been found that lupulones are oxidized more quickly than the reaction products produced and any impurities which may be present. It is assumed that a 6-peroxy-lupulone is primarily formed and under the reaction conditions is spontaneously transformed into a hulupone. There is at first a high rate of oxygen consumption, which in the first instance is dependent only on the energy of the irradiating light.

After conversion of the lupulone present, the oxygen consumption declines in a marked manner. The reaction is then discontinued, since otherwise the yield of hulupone will fall again.

A suitable stage at which to discontinue the reaction can be seen from a graph showing the changes in the pH as the reaction proceeds; pH monitoring in practice is generally simpler than monitoring the oxygen consumption. After the alkali, required for forming the lupulate anion, has been consumed, the pH value of the reaction solution should preferably still be 11–14, e.g. 12–13. Alkali is consumed in the formation of hulupone, so that in the course of the reaction the pH value falls continuously until no further hulupone is formed, and then remains substantially constant. The break in the fall of the pH value, which should preferably be between 6.5 and 9, e.g. 7.5 to 8.5, since the break will be particularly well-defined in that region, is therefore an indication for the discontinuation of the reaction. This applies particularly to alcohol-containing reaction solutions. In strictly aqueous solutions, a slightly higher starting pH value has been found convenient, and in this case the break in the fall of the pH will not be so well-defined. In this case it is generally more advantageous to monitor the oxygen consumption.

It is convenient to use a halogen metal vapor lamp (e.g. a mercury vapor lamp) or a sodium vapor lamp as a light source. Given an adequate proportion of oxygen, the rate of reaction will depend upon the amount of light available for the reaction. Particularly good yields are obtained if the lamp and the sensitizing dye are matched to one another by being so selected that the maximum light yield is obtained, that is to say the spectrum of the emitted light has a maximum substantially coinciding with the absorption maximum of the sensitizer.

According to one feature of the invention, use is made of a sensitizer and solvent which permit the formation of oxylupulone, which can subsequently be isomerized into 5-prenyl-isohumulone, which also has bittering properties.

Strongly polar solvents, e.g. water or an alkanol, acetonitrile, or acetone, or a mixture of one or more of those solvents with water, are preferably used as a reaction medium. However any solvent in which the lupulate anion and the sensitizer are soluble and which does not itself react with the reactant may be employed. Aqueous methanol and water are particularly preferred. In the Examples given below, tap water has been used, for reasons of convenience. The temperature of the reaction mixture is conveniently kept below the boiling point of the mixture. Between 20° and 60°C the temperature has practically no influence on the speed of reaction.

The invention not only provides a new method of producing hulupone-containing products from lupulones and material containing lupulones, but in addition permits a substantially higher yield and rate of reaction to be achieved than in any known process. As already mentioned, not only lupulones but also materials containing lupulones, e.g. the substantially humulone-free bitter substance ("Basex") obtained in the production of isohumulone, are suitable as starting materials, and this is of particular interest to the art. Accordingly, a preferred embodiment of the invention makes use of "Basex".

The product of the process of the invention is preferably purified by acidifying the reaction medium and extracting hulupones in an organic phase, for example in hexane or methylene chloride. By fractional alkali extraction, particularly with a solution of a basic potassium salt, a purified potassium hulupate can be obtained. By taking up the readily water-soluble product in propylene glycol, its utilizability for many purposes can be further improved.

The following Examples illustrate the invention.

EXAMPLE 1

A solution of 100 g of lupulone and 13.0 g of NaOH in 1.4 l of methanol, which are contained in a flask provided with an inlet for $O_2$ (G 3-filter candle), a magnetic agitator, and a water cooling bath, is exposed, after the addition of 1.4 g of methylene blue, to the radiation from a 1000-W metal halogen photographic lamp. During the exposure the oxygen is vigorously circulated by a pump and the saturation of the solution with oxygen is assisted by agitation. After 2 hours 35 minutes and an oxygen consumption of 9.0 l, the reaction is broken off, since a constant pH reading of 7.7 and a considerable decrease in oxygen consumption both indicate an optimal termination time.

The reaction solution is acidified and extracted with hexane, and the hexane extract is dried, mixed with a little activated charcoal, and filtered. After evaporation of the solvent a clear orange-colored oil (73.2 g) with a hulupone content of 44 weight % is obtained.

EXAMPLE 2

A solution of 100 g of lupulone and 18.0 g of NaOH in a mixture of 1 l of distilled water and 2 l of methanol, after the addition of 1.4 g of methylene blue, is treated with oxygen in the apparatus described in Example 1 and irradiated with 1000 W lamp. After 1 hour 50 minutes, the speed of oxygen absorption considerably declines, 10.7 l of $O_2$ having been absorbed. The exposure is terminated and the reaction solution processed as in Example 1. Yield: 56.2 g, with a hulupone content of 50%.

EXAMPLES 3 TO 11

The following Examples 3 to 11 are presented in Table form. Where, in the second column of the Table, the words "dissolved in . . . extracted" are shown, this means that the starting material was dissolved in the solvent indicated and extracted from the organic phase by the reaction media described in Columns 3 and 4. The reaction was carried out as indicated in Example 1, and the same applies to the processing of the reaction solution, except in Examples 7, 8 and 9.

In Examples 7, 8 and 9, the combined hexane phases were extracted with 5.2 g of potassium hydroxide in 1.5 l distilled water (Example 7), with 10.4 g of potassium carbonate and 7.5 g of tripotassium citrate in 2.4 l of water (Example 8), and 6.8 g potassium hydrogen carbonate in 1.3 l of water (Example 9).

In Example 8, the alkaline extract of the reaction product was evaporated to dryness directly in vacuo at a temperature of 60°C and yielded solid potassium hulupate; in Examples 7 and 9, the alkaline extract was mixed with 36 ml (Example 7) and 31 ml (Example 9) of 1,2-propylene glycol, and the water evaporated. A propylene glycol solution of potassium hulupate was thus obtained.

TABLE

| Example | Starting material | Alkali | Reaction medium | Dye | Lamp | Reaction time | $O_2$ consumption | Starting pH | Final pH | Yield |
|---|---|---|---|---|---|---|---|---|---|---|
| 3 | 100 g lupulone dissolved in 1 l.methylene chloride, extracted | 30 g NaOH | 3.0 l. $H_2O$ | 500 g Bengal pink | 1000-W halogen metal vapor lamp | 1 hr. 30 min. | 10.0 l | | | 39.3 g hulupone |
| 4 | 1 g lupulone | 0.130g NaOH | 35 ml $H_2O$ + 35 ml methanol | 10 mg thionine | 150 W slide projector | 1 hr. 45 min. | 140 ml | 12.3 | 6.6 | approx.0.4g hulupone |
| 5 | '' | '' | 35 ml $H_2O$ + 35 ml acetone | 16 mg methylene blue | '' | 2hrs. | 136 ml | 14 | 7.7 | approx. 0.4 g hulupone |
| 6 | '' | '' | 35 ml $H_2O$ + 35 ml acetonitrile | '' | '' | '' | '' | '' | '' | approx.0.4 g hulupone |
| 7 | 120 g Basex = 49 g lupulone dissolved in 1.8 l hexane, extracted | 11.3g NaOH | 0.6 l $H_2O$ 1.2 l methanol | 360 mg methylene blue | 400 W Na high pressure lamp | 55 min. | 6.5 l | 13.8 | 8.3 | 22 g K hulupate |
| 8 | 200 g Basex = 82 k lupulone dissolved in 3 l hexane, extracted | 18.8 g NaOH | 1 l $H_2O$ 2 l methanol | 600 mg methylene blue | 1000 W halogen metal vapor lamp | 2 hrs. 35 min. | 12.7 l | 13.5 | 7.9 | 39.7 g K hulupate |
| 9 | 120 g Basex = 49 g lupulone in 1.8 l hexane, extracted | 11.3 g NaOH | 0.6 l $H_2O$ 1.2 l methanol | 360 mg methylene blue | 400 W halogen metal vapor lamp | 55 min. | 6.2 l | | 7.8 | 24.1 g K hulupate |
| 10 | 250 g Basex = 97.5 g lupulone dissolved in | 28 g NaOH | 0.6 l $H_2O$ 1.2 l methanol | 755 mg methylene blue | '' | 2 hrs. 25 min. | 14.1 l | 13.5 | 8.1 | 45.2 g hulupone |

TABLE-continued

| Example | Starting material | Alkali | Reaction medium | Dye | Lamp | Reaction time | $O_2$ consumption | Starting pH | Final pH | Yield |
|---|---|---|---|---|---|---|---|---|---|---|
| 11 | 4 l hexane, extracted 227 g Basex = 84 g lupulone dissolved in 3.5 l hexane, extracted | 38 g NaOH | 2.4 l $H_2O$ | 112 mg Bengal pink | " | 70 min | 11.7 l | | | 35.2 g = 53 of theory of hulupone |

EXAMPLE 12

An exposure apparatus provided with a gas inlet (glass frit δ3), a gas meter, a gas pump, a Philips HPK 125 W lamp, and a light filter, permeable to light of 400–800 nm, is filled with 200 ml of a solution of 4g (10 millimoles) of colupulone mixed with 1.5 mL of 10 N caustic soda solution (15 millimoles). 40 mg of dye in 50 ml of solution are added thereto in each case. The apparatus is evacuated and subsequently filled with oxygen, and exposure is effected while a current of oxygen is passed through. The consumption of oxygen per unit of time is measured, and after the absorption of one mole-equivalent of oxygen the reaction is broken off. The reaction solution is acidified and extracted with hexane, and the hexane extract is dried, evaporated, and weighed.

The results with different dyes and solvents are shown in the Table below. It should be pointed out that in these Examples it was not attempted to obtain maximum yields; it was merely desired to investigate the fundamental practicability of the process.

From the manufacturers' information regarding emitted radiation energy, the $\phi$ values (i.e. oxygen consumption/irradiating energy) are calculated. If more than one wavelength is absorbed by the dye, $\phi$ values greater than 1 are obtained. In this case the mean $\phi$ values are indicated in brackets.

| Dye | Solvent | Yield g | Hulupone content % | $\phi$ value |
|---|---|---|---|---|
| 1,8-dihydroxy-anthraquinone | methanol | 1.95 | 4.6 | 0.29 | 578 nm |
| 1,8-dihydroxy-anthraquinone | water | 2.1 | 42.8 | 0.59 | " |
| Rufianic acid | " | 3.32 | 25.2 | 0.39 | " |
| Eosin | methanol | 2.1 | 16.5 | 0.58 | 546 nm |
| Phloxin B | " | 2.1 | 42.8 | 0.66 | " |
| Erythrosine B | " | 1.9 | 46.5 | 1.1 (0.6) | 578 nm |
| Bengal pink | " | 2.0 | 35.4 | 1.65 (0.9) | " |
| Thionin | " | 2.8 | 15.9 | 0.1 | " |
| Methylene blue | " | 2.8 | 34.2 | 0.23 | " |
| Methylene green | " | 2.0 | 34.2 | 0.15 | " |
| Chlorophyllin | " | 3.1 | 10 | 0.17 | " |
| Zn-phthalocyanine | " | 2.4 | 12.7 | 0.20 | " |
| Safranine T | " | 2.6 | 42.5 | 0.28 | 546 nm |
| Nile blue | " | 2.7 | 24.7 | 0.065 | 578 nm |
| Rhodamine B | " | 2.4 | 33 | 0.14 | 546 nm |

EXAMPLE 13

The procedure is as in Example 12, but for technical reasons a larger apparatus is used. 4 g (10 millimoles) of colupulone are dissolved in 1 liter of solvent, and mixed with 1.5 ml of 10 N NaOH (15 millimoles) and 40 mg of dye (as shown at the end of this Example) in 250 ml of methanol. An Osram Na-V (sodium vapor 35 W) lamp was used as the light source. After the absorption of 1 mole-equivalent of oxygen, the reaction is broken off, and the reaction solution concentrated, acidified with 2 N sulphuric acid, and twice extracted with hexane. The combined hexane phases are dried, evaporated, and weighed. The hulupone content is determined by titration.

| Dye | Solvent | Yield g | Hulupone content % | $\phi$ NaV35W |
|---|---|---|---|---|
| Methylene blue | Methanol | 2.7 | 42.6 | 0.32 |
| Methylene green | " | 3 | 29.4 | 0.15 |
| Zn-Phthalocyanin sulphonic acid | 50% Methanol/water | 3.32 | 13.5 | 0.39 |

EXAMPLE 14

To provide a comparison with a known process, the oxidation example of German Pat. ("Auslegeschrift") No. 1,300,485 was compared with the procedure according to the invention. 20 g of a humulone-free hop extract ("Basex") with a lupulone content of 41% was used as the starting material. Details of the procedure are given in the Table below.

| | Oxidation according to No. 1,500,485 | Partial Oxidation according to invention |
|---|---|---|
| Starting material | 20.0g of 41% "Basex" | 20.0 of 41% "Basex" |
| Chemicals required: | 220 ml Tri 980 ml $O_2$ | 100 ml $H_2O$/200 ml MeOH 1.9 g NaOH 90 mg methylene blue 1050 ml $O_2$ |
| Energy required: | — | 9 minutes exposure with HQI 400 W: 0.06 kWh |
| Time required: | $O_2$ passed through for 24 hours | $O_2$ passed through for 9 minutes |
| Yield of hulopone: | 21% of theory | 54% of theory |

Not only does the process of the invention give better yields than the procedures of the prior art, but it also permits a substantial shortening of the reaction time (24 hours: 9 minutes). The purity of the product is also substantially better. The product is normally obtained with a purity of about 60–80%, which is generally sufficient for technical purposes. The purity can readily be increased to 80–90% if a slight reduction in yield is accepted.

We claim:

1. A process for the conversion of lupulones into a hulupone-containing beer-soluble bitter-tasting product, comprising:

combining the lupulones and at least one sensitizing dye in a liquid alkaline medium adjusted to a starting pH of 11–14;

oxidizing the lupulones by means of a gas, consisting at least in part of oxygen, under the action of visible light; and discontinuing oxidation when the pH of the medium has dropped to a value of 6.5–9 and at the same time at least one of the following indications is obtained:

1. the oxygen consumption resulting from the reaction exhibits a substantial decline;
2. there is a break in the continuous fall of the pH value.

2. A process as claimed in claim 1, wherein the starting pH is 12 to 13.

3. A process as claimed in claim 2, wherein the reaction is allowed to proceed until the pH has reached a value of 7.5 to 8.5.

4. A process as claimed in claim 1, wherein the reaction is carried out in a polar liquid medium.

5. A process as claimed in claim 4, wherein the reaction is carried out in a medium selected from water, alkanols, acetonitrile, acetone, and mixtures of water with at least one solvent of the group comprising alkanols, acetonitrile and acetone.

6. A process as claimed in claim 5, wherein the reaction is carried out in a medium selected from methanol and aqueous alkanols.

7. A process as claimed in claim 1, wherein the reaction is carried out while bubbles of gaseous oxygen are introduced into the medium.

8. A process as claimed in claim 7, wherein the reaction is carried out with agitation of the medium.

9. A process as claimed in claim 1, wherein said sensitizing dyes are selected from the group consisting of anthraquinone, dihydroxyanthraquinone substituted with a sulphonic acid group, halogenated fluorescein dyes, thiazine dyes, porphyrine dyes, safranine, Nile blue and rhodamine.

10. A process as claimed in claim 1, wherein substantially humulone-free hop bitter extract is used as the starting material.

11. A process as claimed in claim 1, wherein a metal vapor lamp is used as a light source.

12. A process as claimed in claim 11, wherein a sodium vapor lamp is used as a light source.

13. A process as claimed in claim 1, wherein a halogen metal vapor lamp is used as a light source.

14. A process as claimed in claim 13, wherein a mercury vapor lamp is used as a light source.

15. A process as claimed in claim 1, wherein the light used and the dye used are selected to provide substantial coincidence of a maximum of the spectrum of the emitted light with the absorption maximum of the sensitizer.

16. A process as claimed in claim 1, wherein the partial oxidation is carried out in the cold.

17. A process as claimed in claim 1, wherein the reaction product is acidified and is subsequently extracted with an organic solvent and isolated after removal of this solvent.

18. A process as claimed in claim 17, wherein the reaction product, after having been extracted with the organic solvent, is re-extracted therefrom with an alkali solution which is immiscible with the first solvent, and the second solvent is removed, whereby the product is obtained in alkali-salt form.

19. A process as claimed in claim 18, wherein the re-extraction is effected with an alkali solution selected from the group consisting of aqueous potassium hydroxide and aqueous potassium bicarbonate.

20. A process as claimed in claim 19, wherein the re-extraction is effected with buffering to a pH of 5 to 6.

21. A process as claimed in claim 19, wherein the alkaline re-extraction solution is mixed with propylene glycol and the re-extraction medium then removed.

* * * * *